United States Patent
Ikeda et al.

(10) Patent No.: US 8,140,790 B2
(45) Date of Patent: Mar. 20, 2012

(54) FAILURE MANAGEMENT METHOD IN THIN PROVISIONING TECHNOLOGY FOR STORAGE

(75) Inventors: Hirokazu Ikeda, Yamato (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 652 days.

(21) Appl. No.: 12/339,309

(22) Filed: Dec. 19, 2008

(65) Prior Publication Data

US 2010/0088485 A1 Apr. 8, 2010

(30) Foreign Application Priority Data

Oct. 8, 2008 (JP) ................................ 2008-261391

(51) Int. Cl.
*G06F 12/00* (2006.01)
*G06F 11/00* (2006.01)

(52) U.S. Cl. ........ 711/162; 711/156; 711/166; 711/202; 711/203; 714/15; 714/E11.113

(58) Field of Classification Search .................. 711/156, 711/162, 166, 170, 202, 203, E12.002; 714/15, 714/E11.113

See application file for complete search history.

(56) References Cited

U.S. PATENT DOCUMENTS

| | | | | |
|---|---|---|---|---|
| 5,673,382 | A * | 9/1997 | Cannon et al. | 714/6.31 |
| 6,442,663 | B1 * | 8/2002 | Sun et al. | 711/202 |
| 7,631,155 | B1 * | 12/2009 | Bono et al. | 711/156 |
| 2004/0230766 | A1 * | 11/2004 | Cameron | 711/203 |
| 2006/0277386 | A1 | 12/2006 | Eguchi | |
| 2007/0113004 | A1 | 5/2007 | Sugimoto et al. | |
| 2009/0100237 | A1 * | 4/2009 | Orikasa et al. | 711/162 |
| 2010/0011368 | A1 * | 1/2010 | Arakawa et al. | 718/104 |
| 2010/0042802 | A1 * | 2/2010 | Helman et al. | 711/173 |

* cited by examiner

*Primary Examiner* — Matthew Bradley
*Assistant Examiner* — Mehdi Namazi
(74) *Attorney, Agent, or Firm* — Brundidge & Stanger, P.C.

(57) ABSTRACT

A pool is replicated in the unit of volume providing the pool, and when a physical device is blocked, any volume blocked in the pool is changed to the replicated volume so that the pool and a virtual volume can be recovered. With such a configuration, when any pool or virtual volume is blocked due to blockage of any volume providing the thin provisioning function, volume recovery can be swiftly performed without changing the virtual volume used by a host computer, and consumption of storage resources needed therefor can be suppressed.

13 Claims, 21 Drawing Sheets

FIG. 4

THIN PROVISIONING MANAGEMENT TBL 5001

| POOL 5011 | SEGMENT 5021 | Pool VOL 5031 | START LBA 5041 | SEGMENT SIZE 5051 | VIRTUAL VOL 5061 | Split TIME 5071 |
|---|---|---|---|---|---|---|
| Pool 1 | 0001 | PLVOL1 | 0 | 2048 | VVOL1 | — |
| | 0002 | PLVOL1 | 2048 | 2048 | VVOL2 | |
| | 0003 | PLVOL2 | 0 | 2048 | VVOL1 | |
| | ... | ... | ... | ... | ... | ... |
| Pool 2 | 0004 | PLVOL4 | 4096 | 2048 | None | — |
| | ... | ... | ... | ... | ... | ... |
| Pool 2 | 0004 | PLVOL4 | 4096 | 2048 | VVOL3 | 08/31/2008 13:30 |
| | ... | ... | ... | ... | ... | ... |

FIG. 5

CONFIGURATION MANAGEMENT TBL (a) — 5101

| POOL | VIRTUAL VOL | CAPACITY (byte) | HOST COMPUTER | HOST VOL | APPLICATION |
|---|---|---|---|---|---|
| Pool 1 | VVOL1 | 19,995,619,328 | HOST1 | TGT0, LUN1 | DB Server |
| Pool 1 | VVOL2 | 19,995,619,328 | HOST2 | TGT0, LUN2 | Mail Server |
| Pool 2 | VVOL3 | 20,003,876,864 | HOST3 | TGT1, LUN1 | File System |
| Pool 2 | VVOL4 | 20,003,876,864 | — | — | — |
| ... | ... | ... | ... | ... | ... |

CONFIGURATION MANAGEMENT TBL (b) — 5201

| POOL | Pool VOL | CAPACITY (byte) | SECONDARY VOL | COPY PAIR |
|---|---|---|---|---|
| Pool 1 | PLVOL1 | 11,811,467,264 | SVOL1 | PAIR1 |
| ... | ... | ... | ... | ... |
| Pool 2 | PLVOL4 | 19,995,619,328 | SVOL4 | PAIR4 |
| ... | ... | ... | ... | ... |

FIG. 6

BACKUP CATALOG MANAGEMENT TBL (a) — 5301

| Split TIME (5311) | POOL (5321) | VIRTUAL VOL (5331) | CAPACITY (byte) (5341) | HOST COMPUTER (5351) | HOST VOL (5361) | APPLICATION (5371) |
|---|---|---|---|---|---|---|
| 08/31/2008 13:30 | Pool 2 | VVOL3 | 20,003,876,864 | HOST3 | TGT1, LUN1 | File System |
| ... | ... | VVOL4 | 20,003,876,864 | — | — | — |
| | | ... | ... | ... | ... | ... |

BACKUP CATALOG MANAGEMENT TBL (b) — 5401

| Split TIME (5411) | POOL (5421) | Pool VOL (5431) | CAPACITY (byte) (5441) | SECONDARY VOL (5451) | COPY PAIR (5461) |
|---|---|---|---|---|---|
| 08/31/2008 13:30 | | PLVOL4 | 19,995,619,328 | SVOL4 | PAIR4 |
| ... | | ... | ... | ... | ... |

FIG. 9
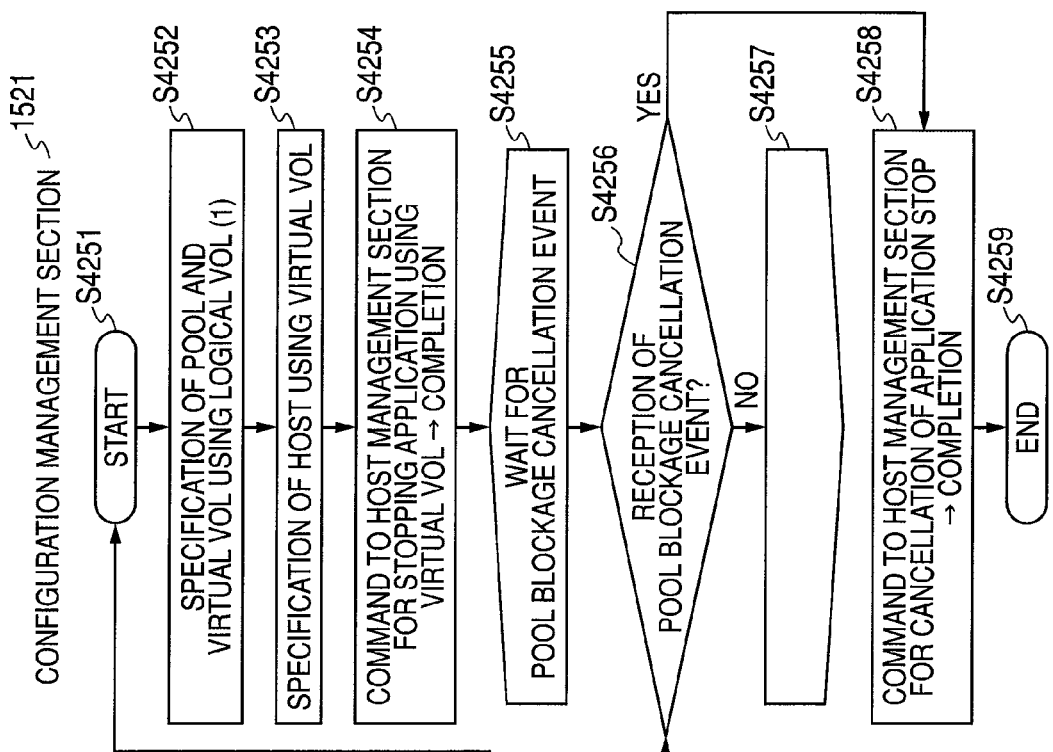
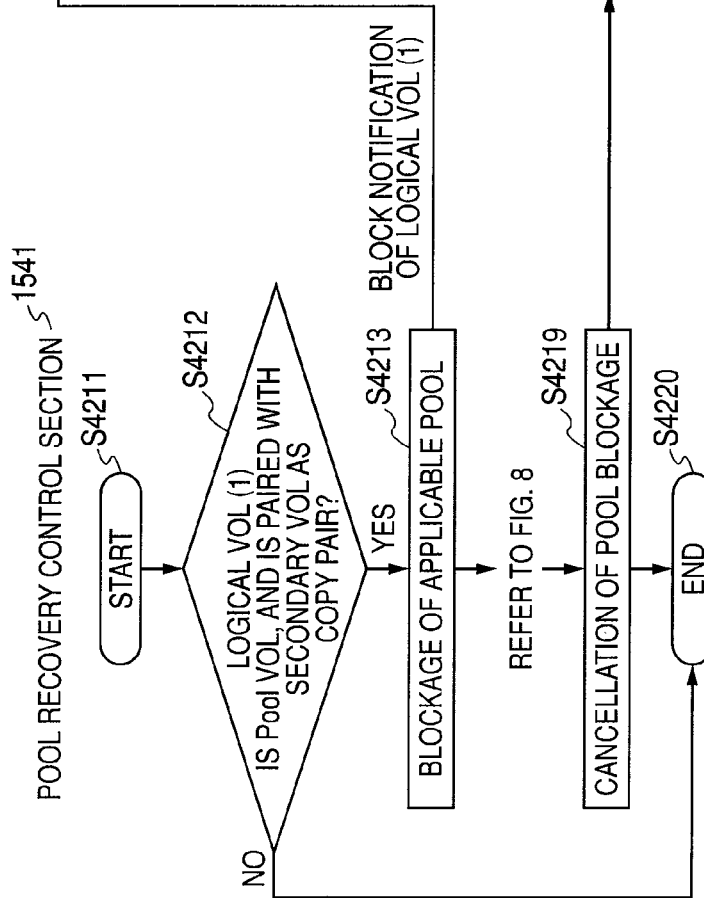

FIG. 15

CONFIGURATION MANAGEMENT TBL (b) ~5202

| POOL ~5212 | Pool VOL ~5222 | CAPACITY (byte) ~5232 | SECONDARY VOL ~5242 | COPY PAIR ~5252 | EXTERNAL STORAGE ~5262 | EXTERNAL VOL ~5272 |
|---|---|---|---|---|---|---|
| Pool 1 | PLVOL1 | 11,811,467,264 | SVOL1 | PAIR1 | STORAGE DEVICE | EVOL1 |
| | PLVOL4 | 19,995,619,328 | SVOL4 | PAIR4 | STORAGE DEVICE | EVOL4 |
| Pool 2 | ... | ... | ... | ... | ... | ... |
| ... | | | | | | |

FAILURE MANAGEMENT METHOD IN THIN PROVISIONING TECHNOLOGY FOR STORAGE

CROSS REFERENCES TO RELATED APPLICATIONS

This application relates to and claims priority from Japanese Patent Application No. 2008-261391, filed on Oct. 8, 2008, the entire disclosure of which is incorporated herein by reference.

BACKGROUND OF THE INVENTION

1. Field of the Invention

The present invention relates to a thin provisioning technology for a storage system and a computer system.

2. Description of the Related Art

With the wide use of a computer, the size of data for handling has been increasing with each passing year. A storage device serves to store such a large-size data with safety and efficiency, and provides a volume (data container) through connection with a computer over a communications line. The problem is that, however, the volume cannot be basically changed dynamically in capacity in accordance with the state of use. This thus requires the volume capacity to be allocated adequately to be on the safe side at the time of system construction, thereby failing to use the capacity resources with good efficiency.

On the other hand, with the thin provisioning technology, a host is provided with a volume having a virtual capacity, i.e., virtual VOL, and on the end of a storage, the capacity is allocated only to data actually written, thereby being able to utilize the volume capacity with good efficiency. A writing destination of data is a large-capacity boundary-free pool configured by a plurality of volumes. Such volumes are hereinafter referred to as pool volumes: "Pool VOLs". As such, the virtual VOL is provided by the pool, the pool is by the Pool VOL, and the Pool VOL is by a physical device (array group). With such a configuration, when a blockage occurs due to a failure of any of the lower components, the components upper thereto basically become entirely not available for use.

In consideration thereof, Patent Document 1 (JP-2006-338341) describes the technology of specifying and correctly blocking, at the time of component blockage, any related portion of blockage by storing the configuration of the components for thin provisioning.

The storage device has been essential infrastructure for continuous business operations mainly for corporations handling a large amount of data. If volumes and data are corrupted and become not available for use due to unexpected accidents and disasters, and computer virus and application error, for example, the business operations may be seriously affected. To be ready for such unexpected volume and data corruption, the data is generally replicated using a copy control function provided by the storage. The result of data replication is referred to as replica or backup. Such data replication in the same storage is hereinafter referred to as local copy, and data replication between the storages is referred to as remote copy. With the copy control function, data synchronization is established from a primary volume (P-VOL) to a secondary volume (secondary VOL). A pair of primary and secondary volumes is referred to as copy pair, and the copy pair is in two states of Pair (synchronous) state and Suspend state. In the Pair state, data is always synchronous, and in the Suspend state, data is not synchronous. Using the copy control function, the state of the copy pair can be changed from the Pair state to the Suspend state, i.e., Split, and from the Suspend state to the Pair state, i.e., Resync. When a logical failure occurs to data in a primary volume, for example, data restoring (Restore/Reverse Resync) can restore the data in the primary volume to the data stored in a secondary volume.

When a replica of a virtual volume is created with the thin provision technology described above, the virtual capacity of the primary volume being a copy source has to be saved as the substantial capacity on the secondary volume end, thereby failing to use the storage capacity of the storage with good efficiency.

In consideration thereof, Patent Document 2 (JP-A-2007-133822) describes the technology of copying, from a copy source, with a secondary volume being a virtual volume, only any data using the real capacity, i.e., only data being allocated with the real storage area, through application of the thin provisioning function also in a copy destination.

In view of efficient use of the storage capacity, there is an external connection function of increasing the volume capacity of the storage device by mapping, into the storage device, a volume (external VOL) of an external storage device (external storage). With such an external connection function, similarly to any internal volume, the internally-mapped external VOL is basically applicable with resources and functions originally provided to the storage device.

SUMMARY OF THE INVENTION

For the purpose of replicating a virtual VOL with good efficiency in terms of capacity, in the technology of the Patent Document 2, a copy destination also configures a pool using the thin provisioning technology. However, this requires a pool of the configuration same as that in the copy source, thereby causing a need to reserve a cache for maintenance of the pool, and resources for the control process.

The technology of Patent Document 2 also requires change of virtual VOLs for recovery from blockage of a physical device or a Pool VOL. Such change of virtual VOLs also requires a process of failure detection and blockage, and a volume change process in response to the operation of a host computer. There thus has a problem of complicated operation and setting in advance, and no swift recovery is possible.

In the invention, a virtual VOL is not replicated in the unit of a configuration set of another virtual VOL and a pool but in the unit of a copy pair for every Pool VOL providing a pool. When a physical device is blocked, the Pool VOL blocked in the pool is changed to a secondary VOL. At this time, in the registration contents of a mapping table between the Pool VOLs and the virtual VOLs, the Pool VOL is rewritten by a secondary VOL for application to the thin provisioning function.

According to the invention, as a method for replicating a virtual VOL with good efficiency in terms of capacity, unlike the technology of the previous technology, i.e., Patent Document 2, a copy destination requires no pool, thereby not requiring a cache for maintenance of the pool and resources for the control process. What is better, change of the virtual VOLs is not required for recovery from the blockage of the physical device or the Pool VOL, and thus swift recovery is possible only in the storage device.

BRIEF DESCRIPTION OF THE DRAWINGS

FIG. 4 shows an exemplary table for a thin provisioning function in the storage device to perform management of the status of segment allocation in the first embodiment of the invention;

FIG. 5 shows an exemplary table for the management server to perform configuration management in the first embodiment of the invention;

FIG. 6 shows an exemplary table for the management server to perform pool backup management in the first embodiment of the invention;

FIG. 9 is a flowchart of a process for the storage device to stop the operation of a computer host to recover from blockage of a Pool VOL or a pool in the first embodiment of the invention;

FIG. 15 shows an exemplary table for a management server to perform configuration management in the second embodiment of the invention;

DESCRIPTION OF THE PREFERRED EMBODIMENTS

In the below, embodiments of the invention are described in detail by referring to the accompanying drawings. Note here that the invention is surely not restrictive to these embodiments.

First Embodiment

Exemplified in a first embodiment is recovery from blockage of a Pool VOL and another blockage of a pool as a result thereof in any specific storage device using a secondary VOL.

Figure 1:
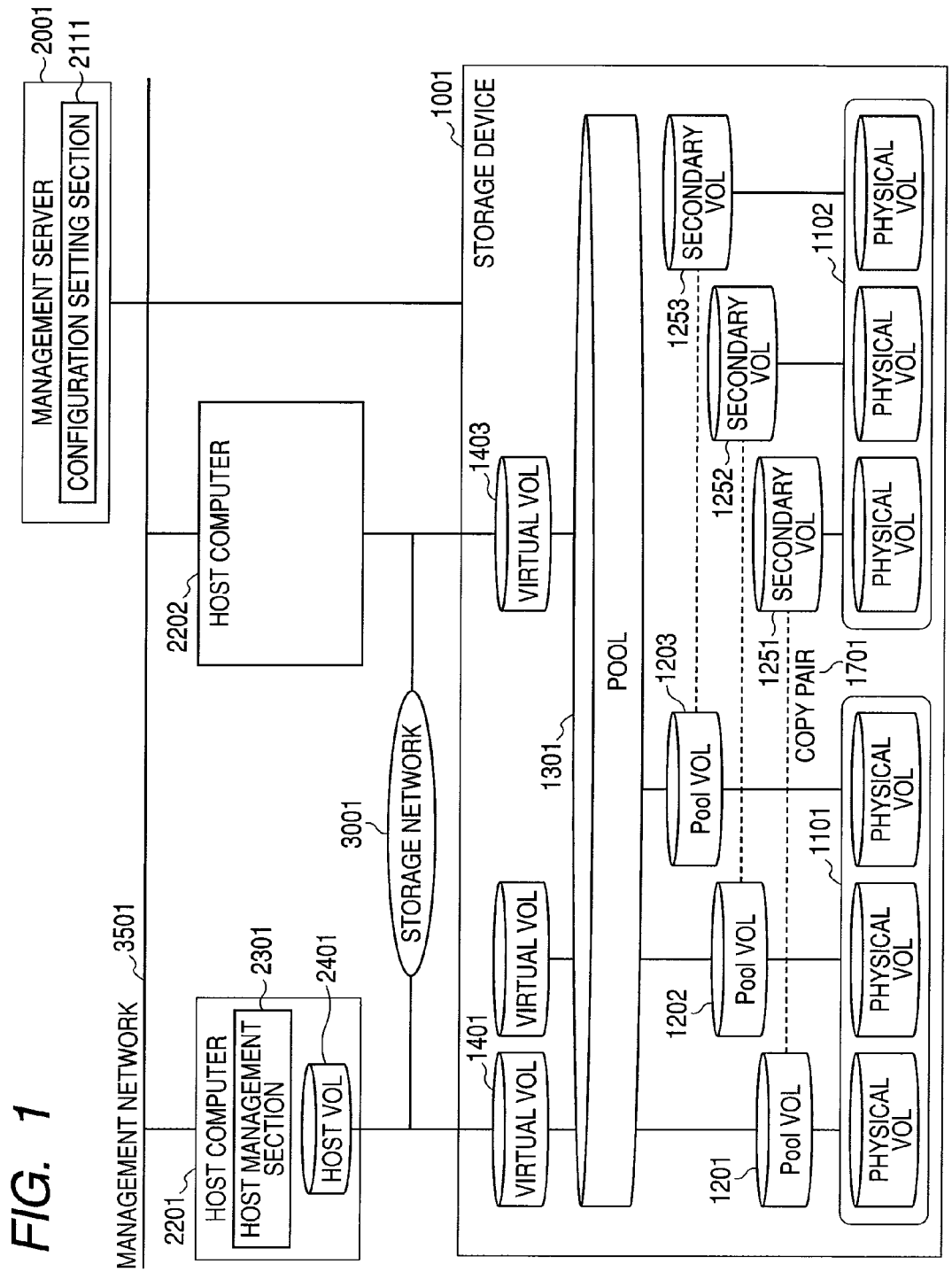
FIG. 1 is a diagram showing an exemplary configuration of a storage system including a computer in a first embodiment of the invention.

FIG. 1 is a block diagram showing a storage system (computer included) in the first embodiment of the invention. Host computers 2201 and 2202 are each a computer such as personal computer, work station, and main frame. In the host computers 2201 and 2202, an application program such as database is run in accordance with various types of operations and applications. These host computers are connected to a storage device 1001 over a storage network 3001, and are not restrictive in number. With the storage device 1001, the host computers 2201 and 2202 perform communication of commands and data needed for input/output related to information processing, and issue a write command when asking for data change. In the below, the host computer 2202 is not explicitly mentioned as is equivalent to the host computer 2201.

The storage device 1001 receives the commands and data coming over the storage network 3001, and executes a predetermined process, thereby making a predetermined response to the host computer 2201. The data stored in the storage device 1001 becomes available for reference and change in the unit of a logical volume, i.e., virtual VOL 1401 in this example, that can be recognized by the host computer 2201. The virtual VOL 1401 is provided from a pool 1301 using the thin provisioning function.

A Pool VOL is a logical volume created from an array group 1101, and one or more Pool VOLs (1201, 1202, 1203, and more) create the pool 1301, which serves as a single data capacity space. By the copy control function provided by the storage device 1001, the logical volume (Pool VOL 1201) can be replicated to be another logical volume (secondary VOL 1251). Herein, a pair of the Pool VOL 1201 and the secondary VOL 1251 is referred to as copy pair 1701, and the state thereof can be changed between Pair (synchronous) and Suspend (pause) by the copy control function. This is also applicable to any other pairs of Pool VOLs and secondary VOLs. For use with business operations, the virtual VOL 1401 is mounted as a host VOL 2401 on a file system operating on the host computer 2201.

A management server 2001 is a computer provided for management of configuration, maintenance, performance, and others of the storage device 1001 over a management network 3501. A configuration setting section 2101 is activated, and the operator-set configuration is applied to the storage device 1001. The configuration setting section 2024 itself may be provided as an internal function of the storage device 1001. Alternatively, by connecting the management server 2001 to the storage network 3001, the configuration may be free from the management network 3501, e.g., management of only In Band.

In the host computer 2201, a host management section 2301 is activated for performing control over an application operating on the host computer and for acquiring any information. With the host management section activated as such, the state of use of the logical volumes provided by the storage device 1001 can be checked. Moreover, communications with the configuration setting section 2111 of the management server 2001 over the management network enables cooperative processing.

Figure 2:
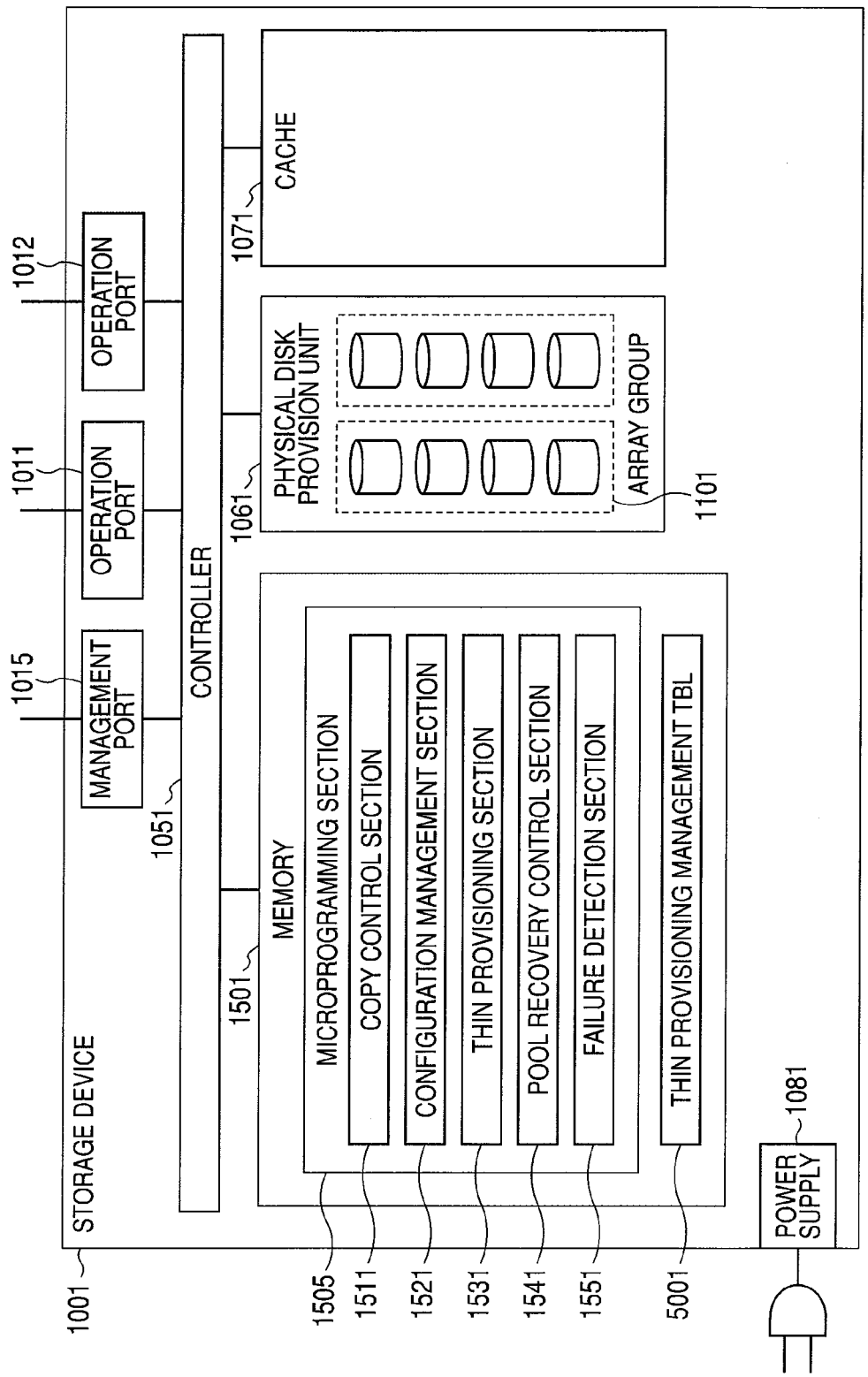
FIG. 2 is a diagram showing an exemplary configuration of a storage device in the first embodiment of the invention.

FIG. 2 is a block diagram showing the internal configuration of the storage device 1001 in the first embodiment of the invention. One or more of array groups 1101 are stored inside of a physical disk provision unit 1101 for supply of electric power. A request for data reference or writing from the host computer 2201 to the virtual VOL 1401 is accepted by a controller 1051 via an operation port 1011 or 1012. In response to the request coming from the host computer 2201 as such, a thin provisioning section 1531 performs data storage (Write) or data reading (Read) to/from a physical volume on any appropriate array group 1101. Such data storage or reading is performed based on the correlation among the virtual volume 1401, the pool 1301, and the Pool VOL 1201. At this time, I/O is sometimes performed at a high speed utilizing an internal high-speed cache 1071.

Figure 3:
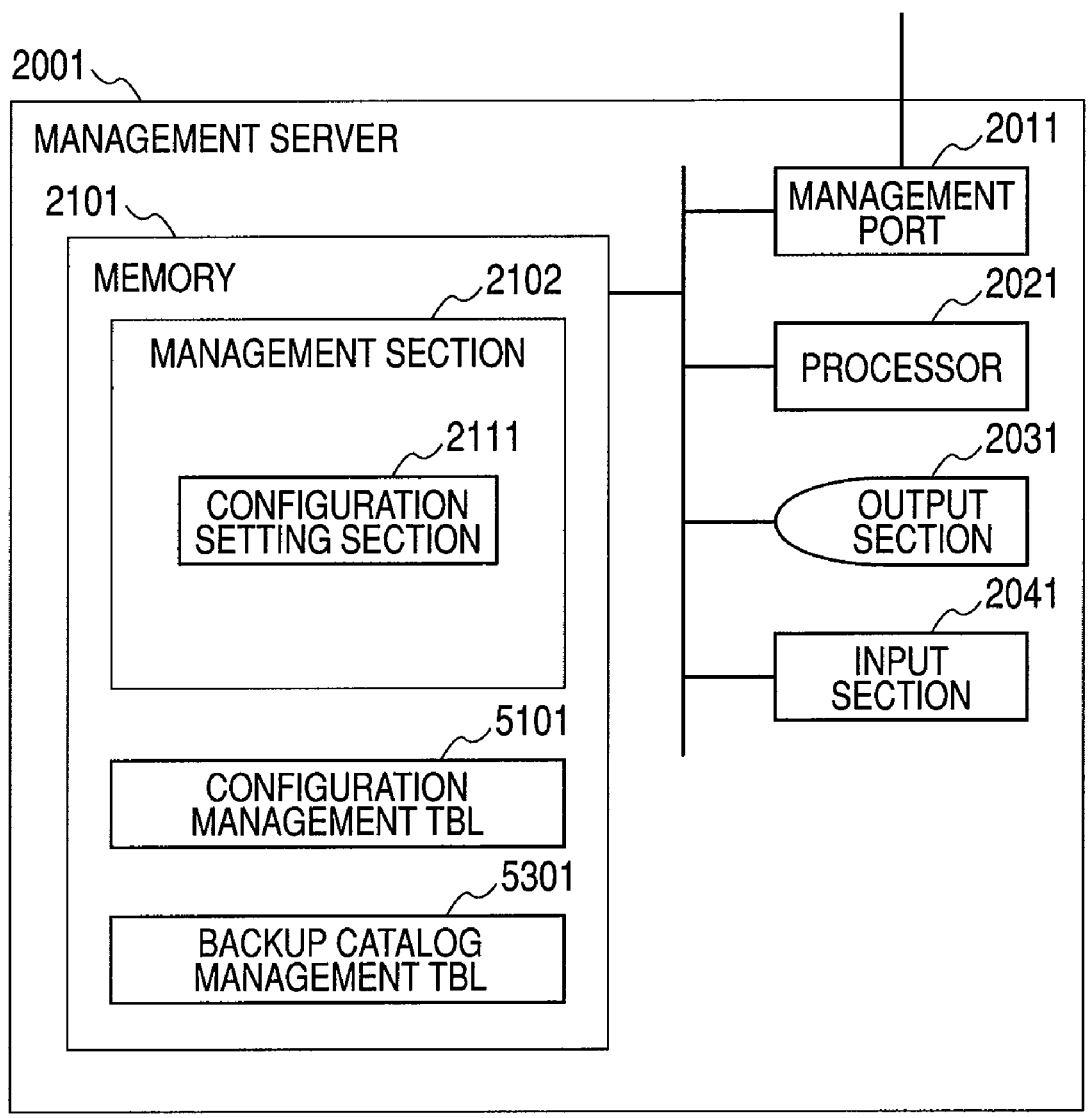
FIG. 3 is a diagram showing an exemplary configuration of a management server in the first embodiment of the invention.

FIG. 3 is a block diagram showing the configuration of the management server 2001 in the first embodiment of the invention. The management server 2001 is connected with the management network 3501 via a management port 2011. A management section 2102 being a management function provided by the management server 2001 is loaded onto a memory 2101, and is controlled by a processor 2021 in terms of activation. The management operation is accepted by an input section 2041 being an interface such as keyboard and mouse, and the operation result or the status of the storage system is output from an operation section 2031 being a display or a mail server, for example.

A configuration management table (hereinafter, abbreviated to TBL) 5101, and a backup catalog management TBL are loaded as appropriate from a secondary storage device, e.g. hard disk, in the management server 2001 to the memory 2101, and is used from the configuration setting section 2111. The storage destination of such tables is not restrictive to inside of the management server 2001 but may be a memory 1501 of the storage device 1001.

FIG. 4 shows in detail an example of a thin provisioning management TBL 5001. This table stores the status of allocation of a data area (segment) to be provided by the pool 1301 to a virtual VOL 1403 on a pool basis. Herein, the segment is sometimes referred to as chunk or page. As information about the segment provided by the pool, stored are values for the elements of "segment identifier 5021", "Pool VOL identifier 5031", and "virtual VOL identifier 5061", and others. The element of "Pool VOL identifier 5031" indicates the identifier of the Pool VOL providing the segment, and the element of "virtual VOL identifier 5061" indicates the identifier of the virtual VOL to which the segment is provided.

FIG. 5 shows in detail an example of the configuration management TBL 5101. The configuration management TBL 5101 is configured by two tables of a configuration management TBL (a) 5101, and a configuration management TBL (b) 5201. The configuration management TBL (a) 5101 stores the mapping between the pools 1301 and the virtual VOLs 1401, and the configuration management TBL (b) 5201 stores the mapping among the pools 1301, the Pool VOLs 1201, and the secondary VOLs 1251.

The configuration management TBL (a) 5101 defines, on a pool basis, the virtual VOL 1403 using the pool 1301, the host computer 2202 using the virtual VOL 1403, a host VOL 5142 being the virtual VOL 1403 mounted as a volume on the host, and an application 5143 utilizing the host VOL 5142. When the host management section 2301 of the host computer 2201 stores the configuration information about the host VOL 5142 and that about the application 5143, the configuration management TBL (a) 5101 is not required to store such configuration information. The mapping can be established between the virtual VOLs 1403 and the host VOLs 2401 using a target ID of the host VOL or a LUN ID, for example.

FIG. 6 shows in detail an example of the backup catalog management TBL 5301. The backup catalog management TBL 5301 stores the time of pool backup (Split) on the basis of the pool 1301 in an element of "Split time 5311". The remaining configuration is similar to the configuration management TBL 5101, i.e., the backup catalog management TBL 5301 is configured by a backup catalog management TBL (a) 5301 storing the mapping between the pools 1301 and the virtual VOLs 1401, and a backup catalog management TBL (b) 5401 storing the mapping between the pools 1301, the Pool VOLs 1201, and the secondary VOLs 1251.

Figure 7:
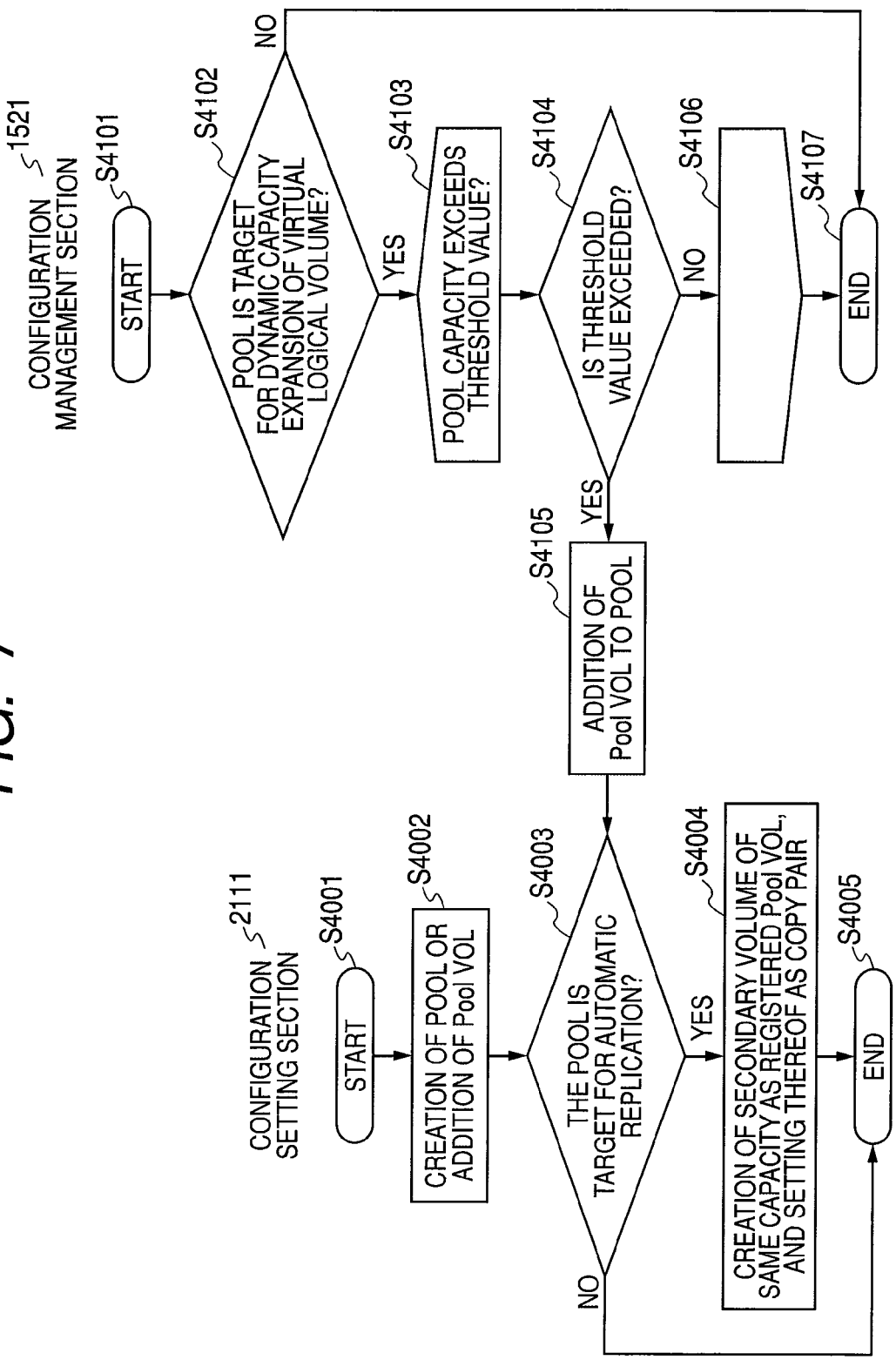
FIG. 7 is a flowchart of a process for the storage device and the management server to perform pool configuration management in the first embodiment of the invention.

For maintaining the availability of the pools 1301, when any of the pools 1301 is changed in configuration, the configuration of a replica thereof has to be also changed. FIG. 7 shows a flowchart of a process of mapping, when any addition is made to the pool 1301 or to the Pool VOL 1201 of the pool 1301, the Pool VOL 1201 being an addition to the secondary VOL 1251 as a copy pair. When a command for such an addition is issued from a management tool, for example, the configuration setting section 2111 on the management server 2001 executes a setting execution process (step S4002).

The configuration management TBL 5101 or others define in advance whether the pool 1301 is a target for automatic replication or not. When the definition tells that the pool 1301 asked for addition is a target for automatic replication (step S4003), the secondary VOL 1251 of the same capacity as the registered Pool VOL 1201 is set as a copy pair 1701 with the Pool VOL 1201 (step S4004). When there is no such a secondary VOL 1251 of the same capacity, such a secondary VOL is generated from the array group 1101.

On the other hand, when the physical capacity of the pool 1301 is not enough, the thin provisioning function includes allocation-on-use (AOU) with which the configuration management section 1521 additionally provides the Pool VOL 1201 to the pool 1301. When the pool 1301 is a target for such an allocation-on-use (AOU) function, when the capacity of the pool exceeds a predetermined threshold value, i.e., use ratio of the physical capacity, the Pool VOL 1201 is additionally provided to the pool 1301 (step S4105), and notifies the addition to the configuration setting section 2111. Upon reception of the notification, the configuration setting section 2111 starts executing the process of step S4003. Alternatively, the process of step S4003 and thereafter may be continuously executed by the configuration management section 1521 itself.

Figure 8:
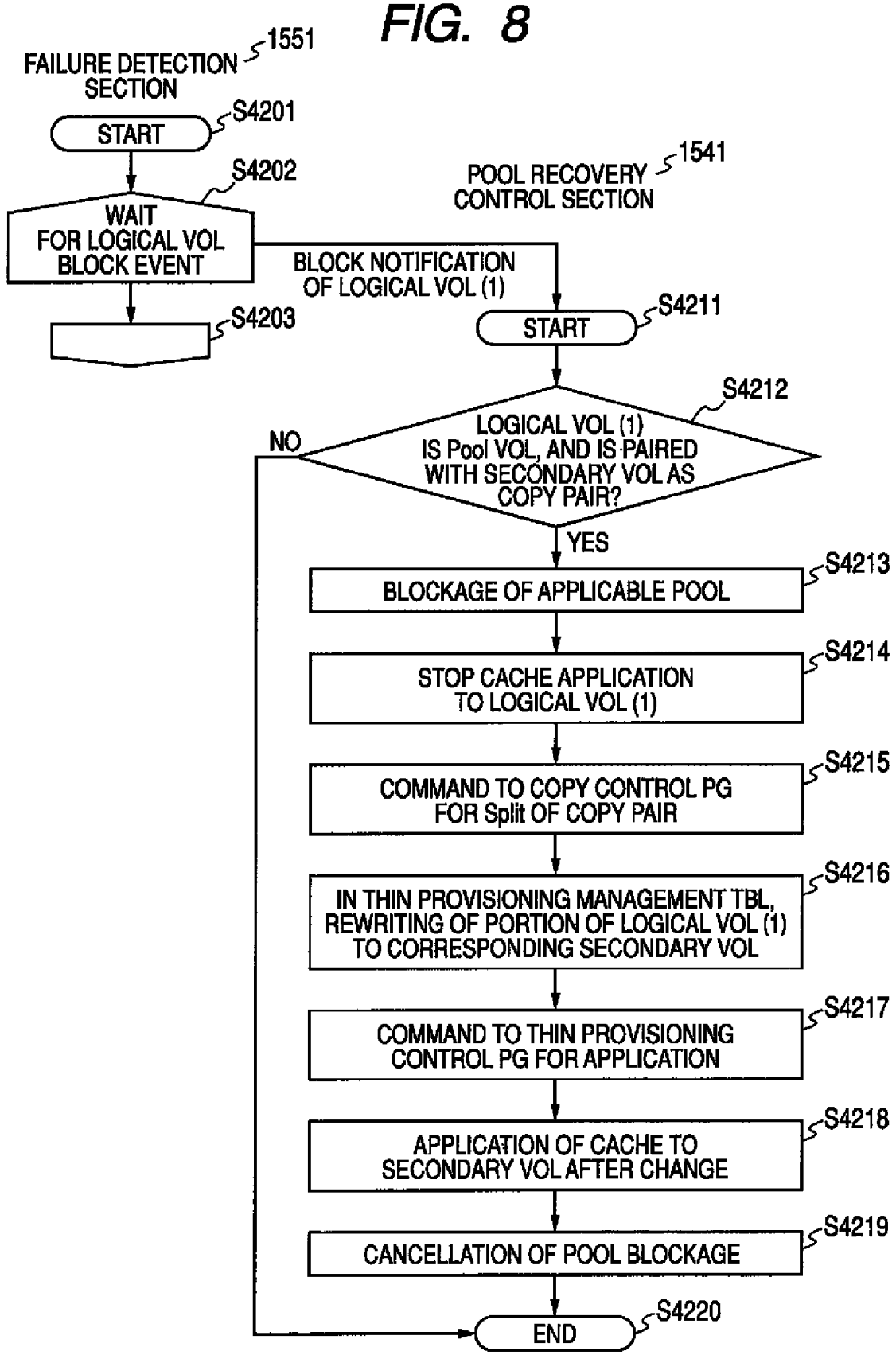
FIG. 8 is a flowchart of a process for the storage device to recover from blockage of a Pool VOL or a pool in the first embodiment of the invention.

FIG. 8 shows a flow of recovering the pool 1301 from blockage of any volume providing the pool 1301. When the array group 1101 or the logical VOL (Pool VOL 1201) is blocked due to occurrence of a failure, the blockage is detected by a failure detection section 1551, and notifies the portion of blockage to a pool recovery control section 1541. The pool recovery control section 1541 refers to the configuration management TBL 5101 to determine whether the portion of blockage belongs to the Pool VOL 1201, and whether the copy pair 1701 is with the secondary VOL 1251. When the copy pair 1701 is with the secondary VOL 1251, the pool 1301 utilizing the Pool VOL 1201 is blocked, and application of Write cache from the host computer 2201 to the Pool VOL 1201 is stopped.

Next, a command is issued to the copy control section for cancelling (or splitting) the copy pair 1701. For removing the blocked Pool VOL 1201 from the pool 1301, and for registering the secondary VOL 1251, in the thin provisioning management table 5001, the portion of the blocked Pool VOL 1201 in the element of "VOL identifier 5031" is replaced with the secondary VOL 1251, and the thin provisioning section 1521 is applied. Lastly, a Write cache is applied with respect to the secondary VOL 1251 newly registered as the Pool VOL, and clears the blockage of the pool.

FIG. 9 shows a flowchart of stopping the application of the host computer 2201 for recovering the pool 1301 from blockage of any volume providing the pool 1301. The operation of the failure detection section 1551 and that of the pool recovery control section 1541 are the same as those in FIG. 8, and thus are not entirely shown in FIG. 9. When the pool recovery control section 1541 forwards a notification about the blockage of the logical VOL (1) to the configuration management section 1521, the configuration management section 1521 responsively specifies the pool 1301 and the virtual VOL 1401 using the logical VOL (1) (step S4253), and communicates with the host computer 2201, thereby issuing a command to the host management section 2301 for stopping the application using the virtual VOL 1401. The applicable application can be specified by the configuration management TBL (a) 5101. The host management section 2301 issues a command for stopping the application, and after completion of the command, issues a completion event to the configuration management section.

On the other hand, when clearing the blockage of the pool (step S4219), the pool recovery control section 1541 forwards a pool blockage clearance event to the configuration management section 1521. Upon reception of such a pool blockage clearance event (step S4256), the configuration management section 1521 issues a command to the host management section for cancelling the application stop (step S4258), and ends the process after receiving a completion event.

Described now is a method of, when some logical failure occurs to data in a virtual VOL due to virus or others, restoring the data using the secondary VOL 1251 of the Pool VOL 1201. With this method, every Pool VOL 1201 providing the pool is in the configuration of the copy pair 1701 with the secondary VOL 1251, and the data is restored (Reverse Resync) from the secondary VOL to the Pool VOL 1201 at the time of the logical failure, thereby being able to restore the data of the virtual VOL at the time of the last backup in the unit of a pool.

Figure 10:
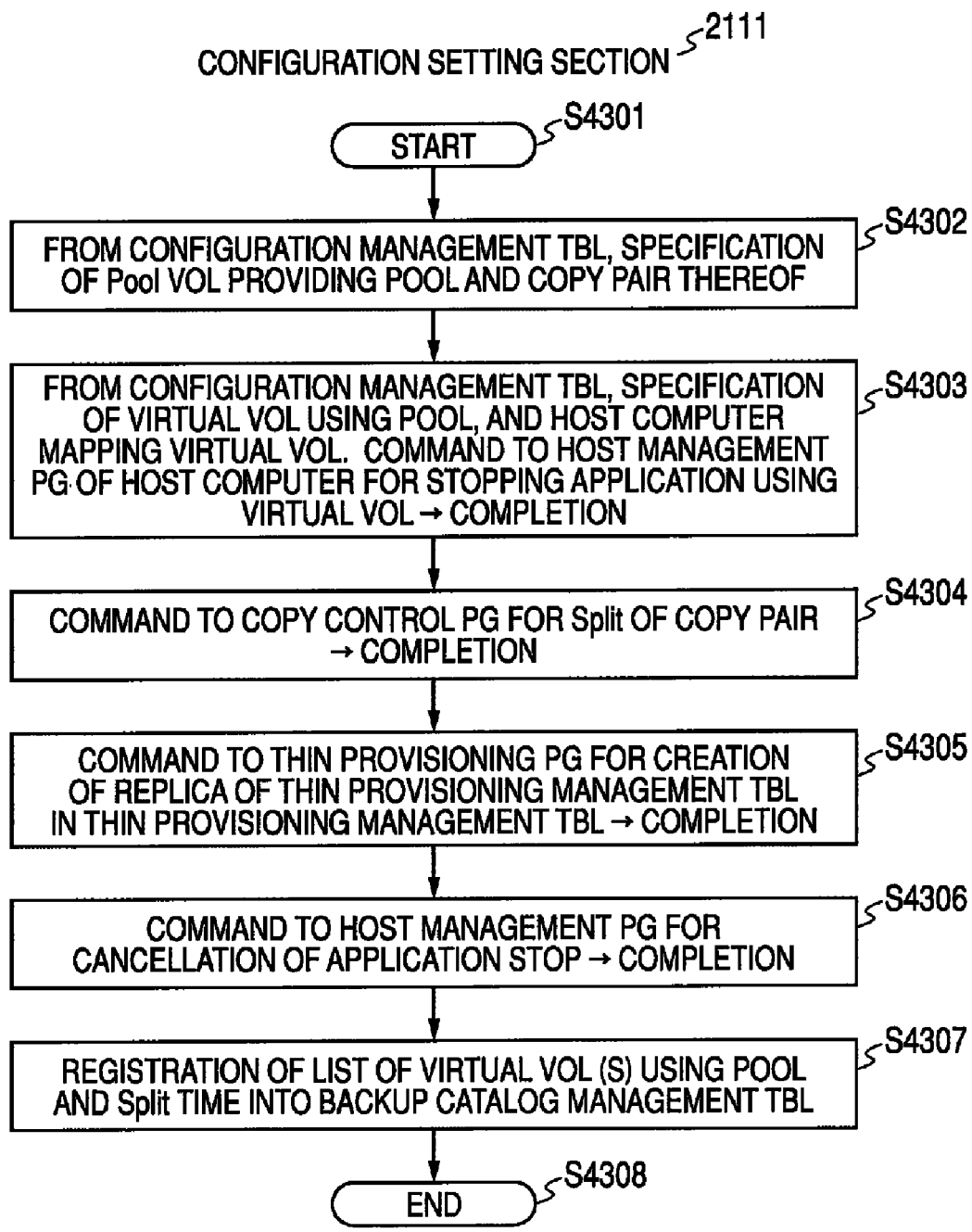
FIG. 10 is a flowchart for the management server to backup a pool or a virtual VOL in the first embodiment of the invention.

FIG. 10 shows a flowchart of backing up the pool 1301. This flowchart is based on the premise that the copy pair 1701 is being in the pair state, i.e., data synchronization is being established, in the configuration of FIG. 1. First of all, the pool 1301 or the virtual VOL 1401 is designated for backup by a management tool or others. The configuration setting section 2111 then refers to the configuration management TBL 5101 to specify the Pool VOL 1201 and the copy pair 1701 providing the pool 1301. When any of the virtual VOLs 1401 is designated, the pool 1301 being a target is specified from the configuration management TBL 5101 in advance.

Thereafter, for the virtual VOL 1401 using the pool 1301, the application is stopped on the host computer 2301 using the virtual VOL 1401. For stopping the application, the flowchart of FIG. 9 is referred to. After completion of the application stop, when any Write cache is remained, the Write cache is applied to the Pool VOL 1201. Thereafter, a command is issued for Splitting (cancellation of data synchronization) of the copy pair 1701 specified above (S4304). When the copy pair 1701 is put in the state of Suspend, a command is issued to the thin provisioning section 1531 for additionally registering the state of segment allocation to the thin provisioning TBL 5001 at the time of backup (step S4305).

Thereafter, the time is set to the element of "Split time 5071" of FIG. 4. After completion of update of the thin provisioning TBL 5001, the application stop is cleared (for details, the description given by referring to the flowchart of FIG. 9 is referred to). The configuration setting section 2111 registers, into the backup catalog management TBL 5301, a list of virtual VOLs using the pool 1301 and the Split time, and then ends the process.

Figure 11:
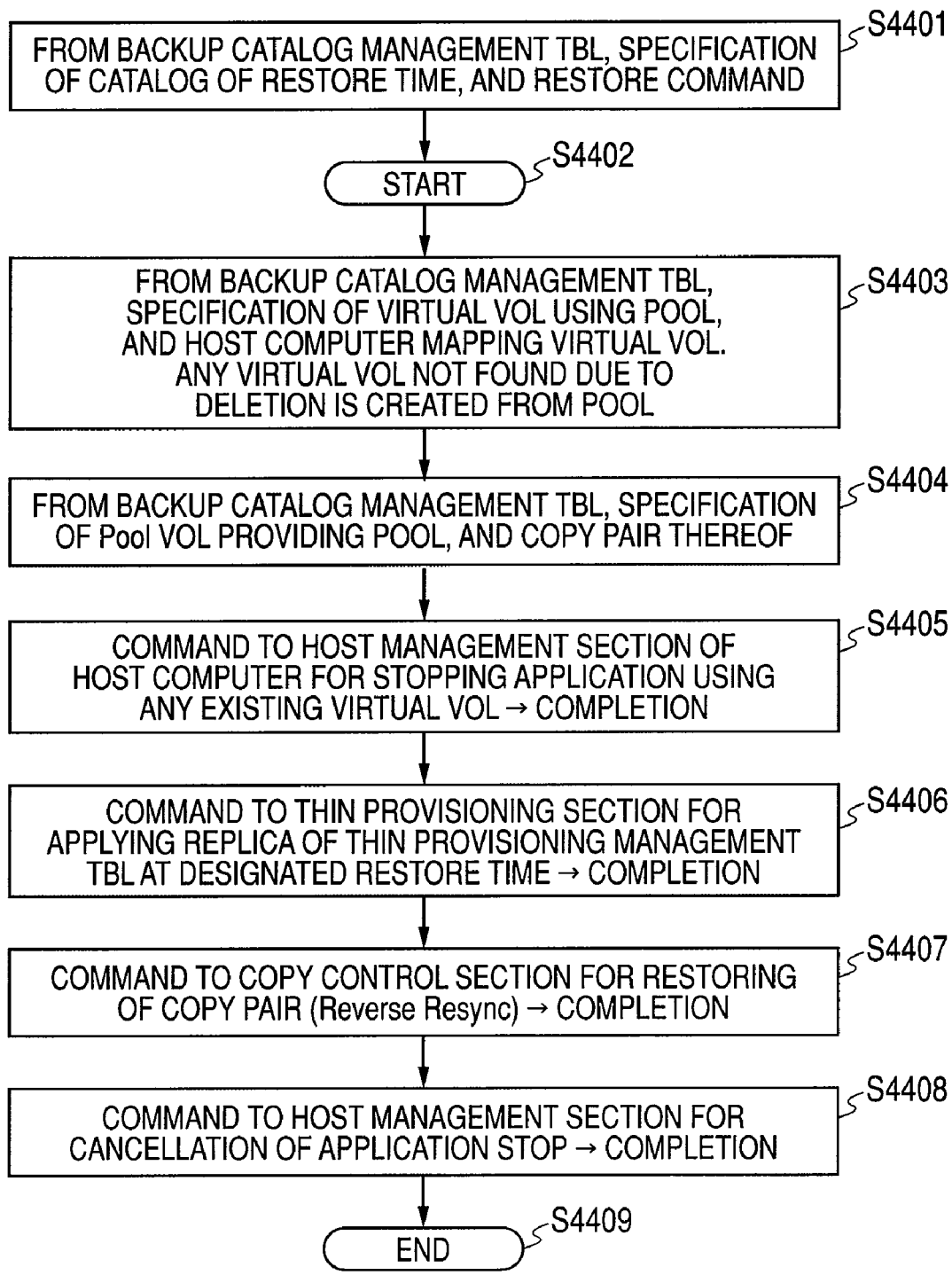
FIG. 11 is a flowchart for the management server to restore data in a virtual VOL or a pool in the first embodiment of the invention.

FIG. 11 shows a flowchart of restoring the data in the pool 1301 being the backup result in the process of FIG. 10. First of all, from the backup catalog management TBL 5301, the catalog of a time for data restoring is designated so that a command for data restoring is issued. The configuration management section 2111 specifies, from the backup catalog management TBL 5301, the virtual VOL 1401 using the pool, and the host computer 2201 mapping the virtual VOL 1401. If any of the virtual VOLs 1401 is not found due to deletion or others, the configuration management section 2111 creates the virtual VOL 1401 from the pool (step S4403). The configuration management section 2111 then specifies, from the backup catalog management TBL 5301, the Pool VOL 1201 providing the pool 1301 and the copy pair 1701 thereof. The configuration management section 2111 then issues a command to the host management section 2301 of the host computer 2201 for stopping the application using any of the virtual VOLs 1401 found in the catalog (step S4405).

After the completion of application stop, in the thin provisioning TBL 5001, the management information with which the pool 1301 is Split at the time is specified, and then a command is issued to the thin provisioning section 1531 for application of the management information. After application of the management information, a command is issued to the copy control section 1511 for restoring the copy pair 1701 specified as above (Reverse Resync). Lastly, a command is issued to the host management section 2301 for cancelling the application stop (step S4408), and this is the end of the process.

Second Embodiment

Exemplified in a second embodiment is a method of recovering, in the configuration in which an external storage is connected, using an external VOL, when any Pool VOL is blocked in the storage device serving as a controller, and when any pool is blocked as a result thereof.

Figure 12:
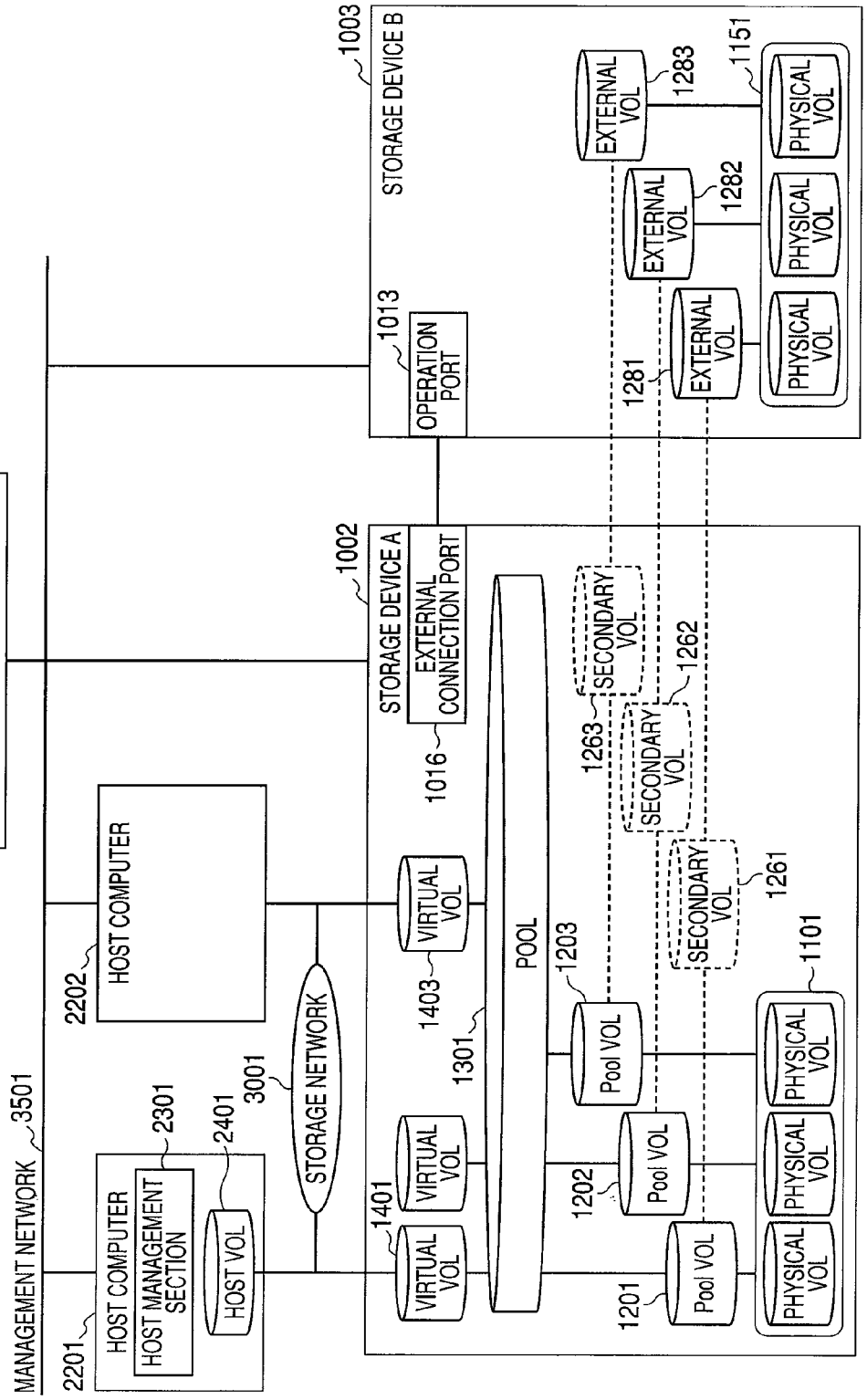
FIG. 12 is a diagram showing an exemplary configuration of a storage system including a computer in a second embodiment of the invention.

FIG. 12 is a block diagram showing a storage system (computer included) in the second embodiment of the invention. The components, i.e., the host computer, the storage device, the management server, the management network, and the storage network, are basically the same as those in FIG. 1, and thus are not described twice. The difference from FIG. 1 lies in that, using the external connection function of a storage device A1002, an external VOL 1281 of a storage device B1003 is mapped as a secondary VOL 1263 in the storage device A1002. For application of the external connection function, the storage device A1002 and the storage device B1003 are connected together physically over a communications path via an external connection port 1016 and an operation port 1013, respectively. An external VOL 1151 is generated from an array group 1151 in the storage device B. The configuration in the management server 2001 is the same as that in FIG. 3, and thus is not described again.

Figure 13:
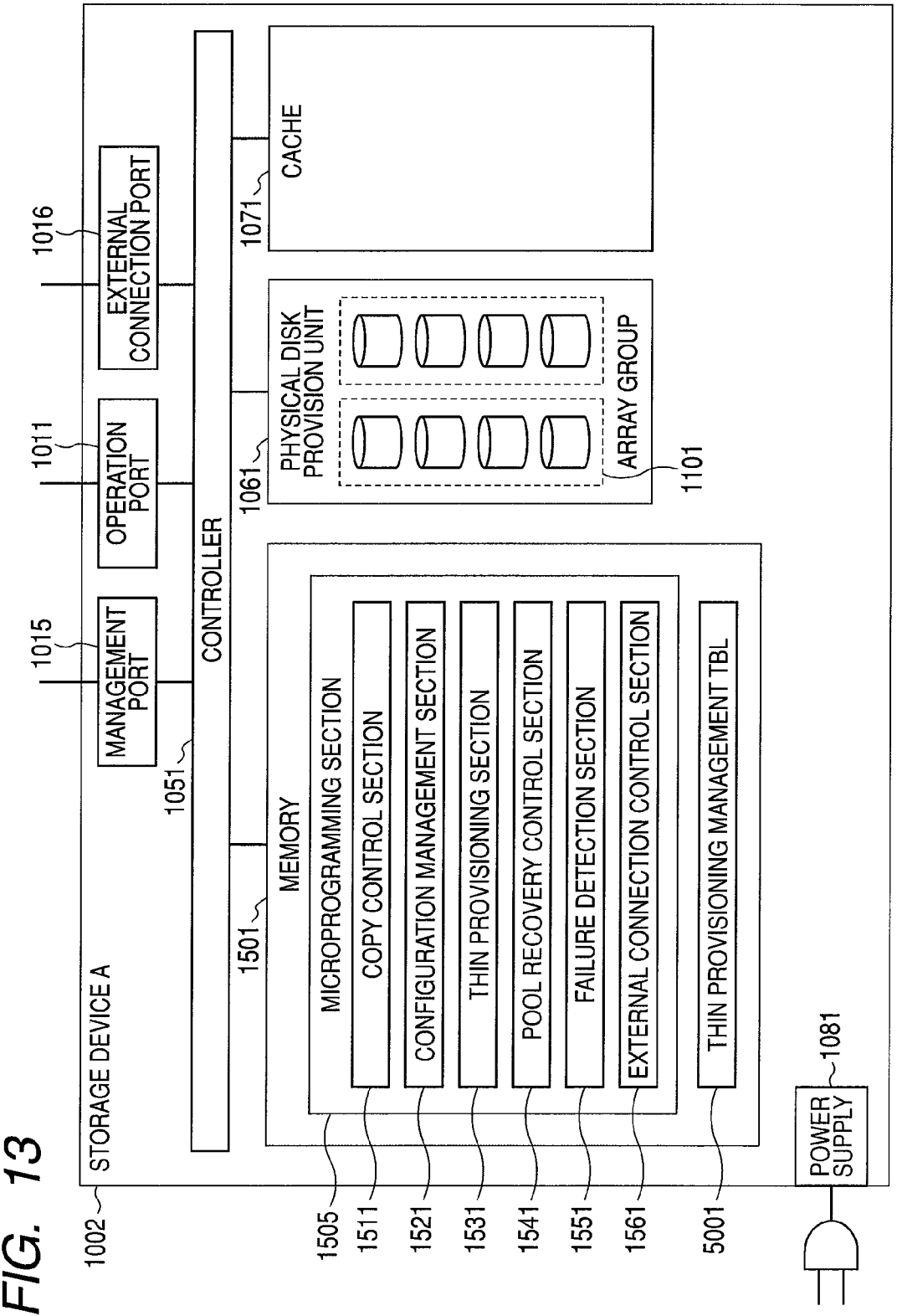
FIG. 13 is a diagram showing an exemplary configuration of a storage system in the second embodiment of the invention.
Figure 14:
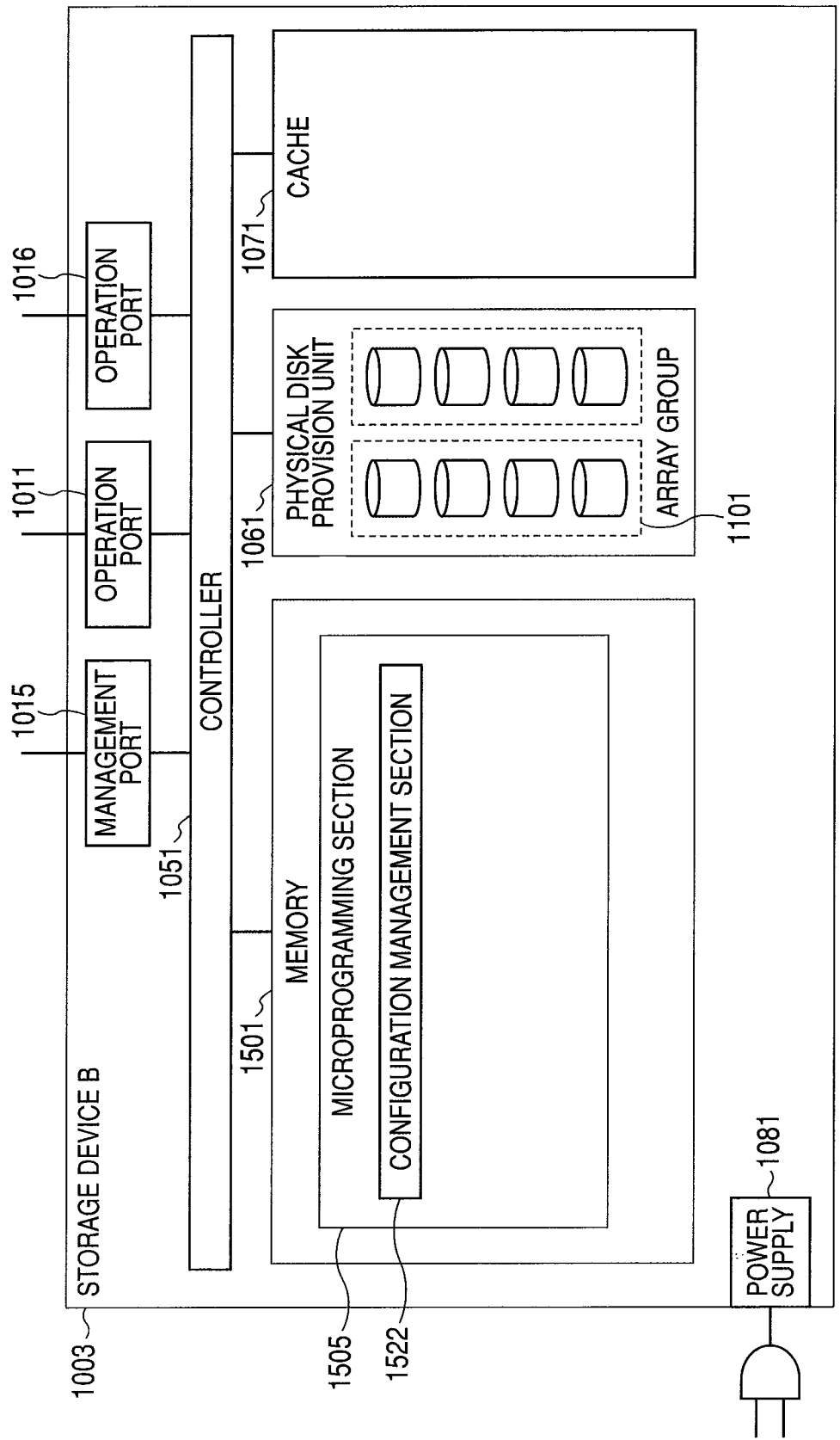
FIG. 14 is another diagram showing the exemplary configuration of the storage system in the second embodiment of the invention.

FIGS. 13 and 14 are block diagrams respectively showing the configuration of the storage device A 1002 and that of the storage device B1003 in the second embodiment of the invention. The components, i.e., the port, the controller, the array group, the memory, and the cache, are basically the same as those in FIG. 2, and thus are not described twice. In FIG. 13, the differences from FIG. 2 are that the external connection port 1016 is provided for connection with the storage device B, and a microprogramming section 1505 includes an external connection control section 1561 as a program for controlling the external connection function. In FIG. 14, the difference from FIG. 2 is that the microprogramming section 1505 includes only a configuration management section 1522.

FIG. 15 shows in detail an example of a configuration management TBL (b) 5202. The basic configuration thereof is the same as that of the configuration management TBL (b) 5201 of FIG. 5, and thus is not described again. In FIG. 15, the difference from FIG. 5 is that an element of "identifier 5262" of the external storage (the storage B 1003 in the configuration of FIG. 12), and an element of "identifier 5272" of the external VOL 1281 are included.

Figure 16:
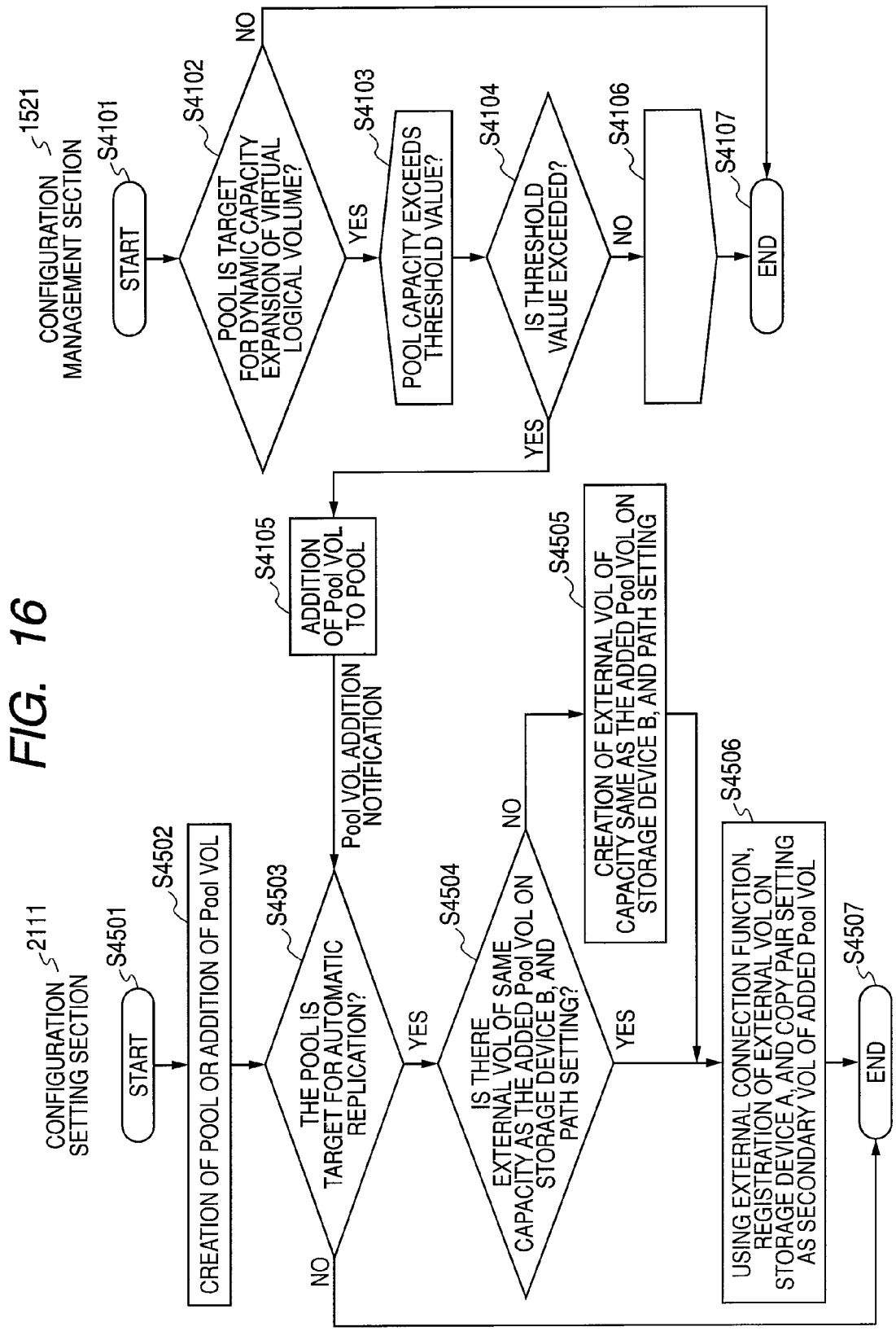
FIG. 16 is a flowchart of a process for the storage device or the management server to perform the pool configuration management in the second embodiment of the invention.

Also in the configuration of the second embodiment, for keeping the availability of the pools 1301, when any of the pools 1301 is changed in configuration, there needs to also change the configuration of a replica thereof. FIG. 16 shows a flowchart of mapping, when any addition is made to the pool 1301 or to the Pool VOL 1201 of the pool 1301, the Pool VOL 1201 being an addition to the secondary VOL 1251 as a copy pair. Any process same as that of FIG. 7 is not described again.

In this embodiment, the secondary VOL 1251 is so configured as to map the external VOL 1281, thereby requiring to map the external VOL 1281 at the time of copy pair setting. When the pool is a target for automatic replication in the process of step S4503 of the configuration setting section 2111, the configuration setting section 2111 determines whether any external VOL of the same capacity as the Pool VOL being an addition is located on the storage device B, and is through with a path setting or not.

When the determination result is Yes, with respect to the configuration management section 1521 of the storage device A, the external VOL 1281 is registered as a logical VOL on the storage device A 1002, and a command is issued for forming the copy pair 1701 in which the logical VOL is the secondary VOL 1251 of the added Pool VOL 1201 (step S4506). When the determination result is No, with respect to the configuration management section 1522 on the storage device B1003, an external VOL of the same capacity as the Pool VOL 1201 being an addition is created on the storage device B1003, and a command is then issued for path setting. After completion of such a process, the procedure goes to the process of step S4506 described above.

The flow for recovering the pool 1301 from blockage of any volume providing the pool 1301 is the same as the processes of FIGS. 8 and 9 in the first embodiment, and thus is not described again.

Third Embodiment

In a third embodiment, exemplified is a method of recovering, in the configuration in which an external storage is connected, when a storage device serving as a controller is entirely blocked, the storage device using the external storage.

Figure 17:
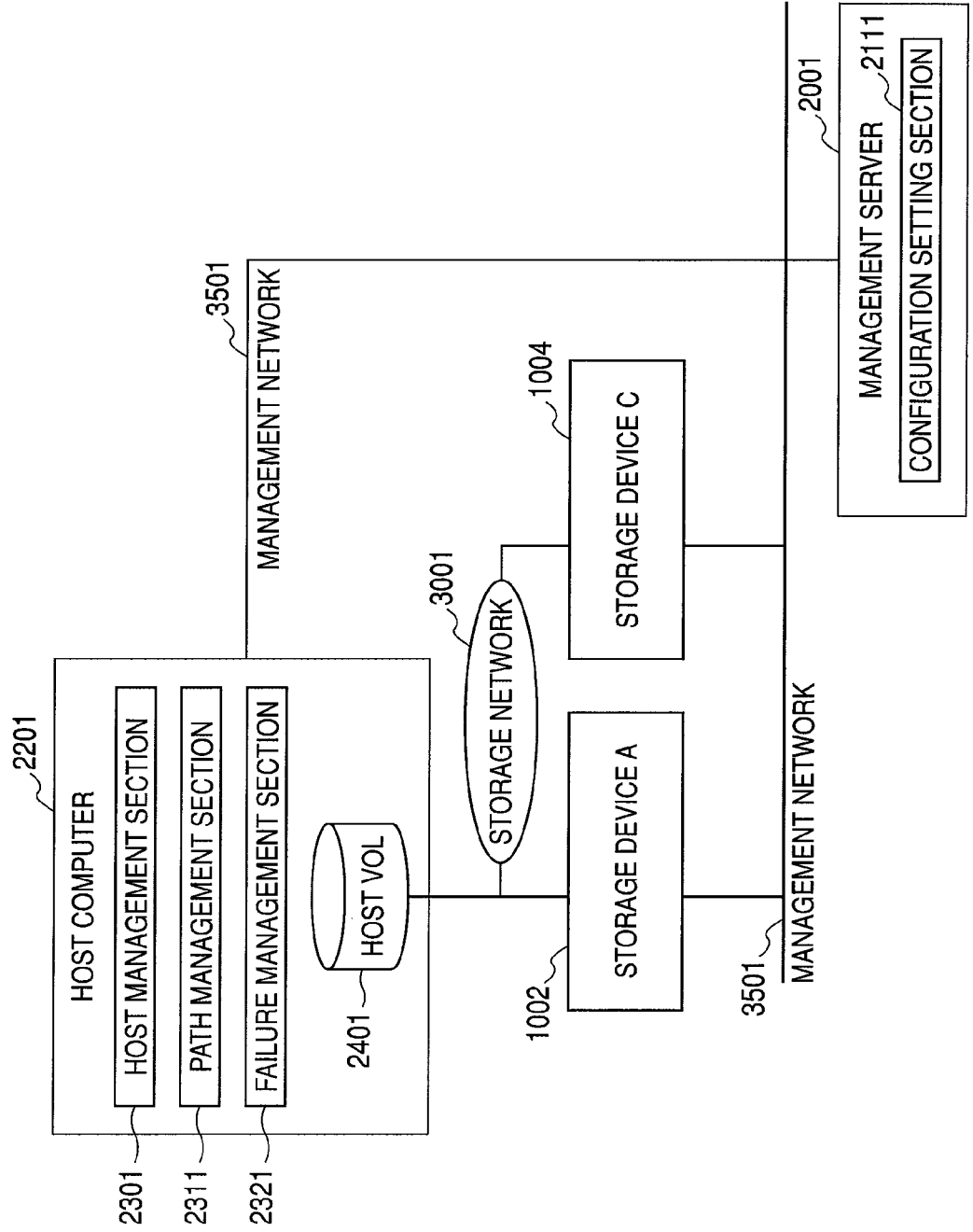
FIG. 17 is a diagram showing an exemplary configuration of a storage system including a computer in a third embodiment of the invention.

FIG. 17 is a block diagram showing a storage system (computer included) in the third embodiment of the invention. In FIG. 17, the internal configuration of the storage device A1002 and that of a storage device C1004 are respectively the same as that of the storage device A1002 of FIG. 12 and that of the storage device B1003 thereof, and thus are not described again. The components, i.e., the host computer, the management server, the management network, and the storage network, are basically the same as those of FIG. 12, and thus are not described again. The host computer 2201 is configured to include, in addition to the host management section 2301, a path management section 2311 for path change with a volume in the storage device, and a failure management section 2321 for detecting any failure of the storage device itself.

Figure 18:
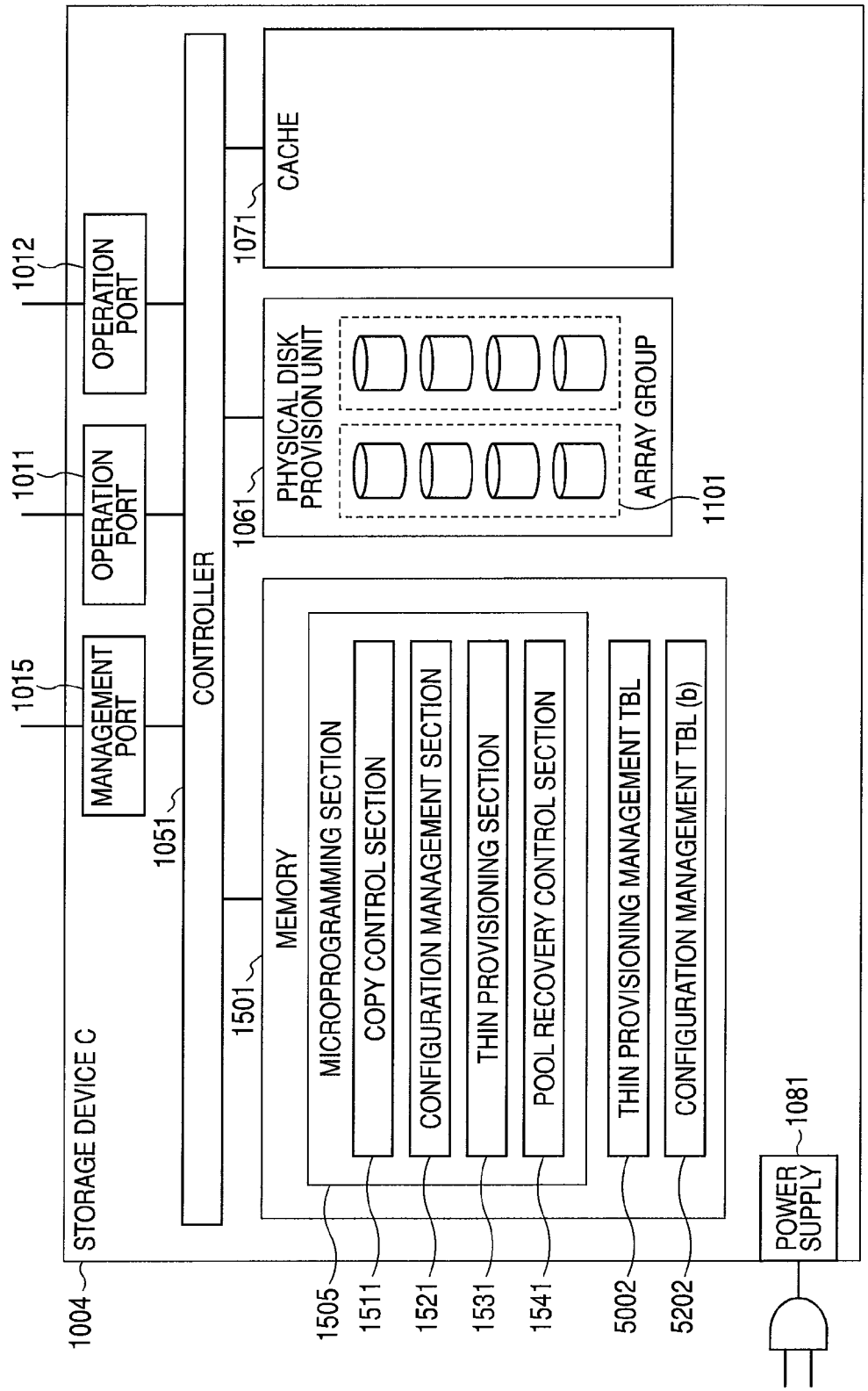
FIG. 18 is a diagram showing an exemplary configuration of a storage device in the third embodiment of the invention.

FIG. 18 is a block diagram showing the internal configuration of the storage device C1004 in the third embodiment of the invention. The components, i.e., the port, the controller, the array group, the memory, and the cache, are basically the same as those in FIG. 2, and thus are not described again. In FIG. 18, the difference from FIG. 2 is that the failure detection section 1551 and the configuration management TBL (b) 5202 are not both included.

Figure 19:
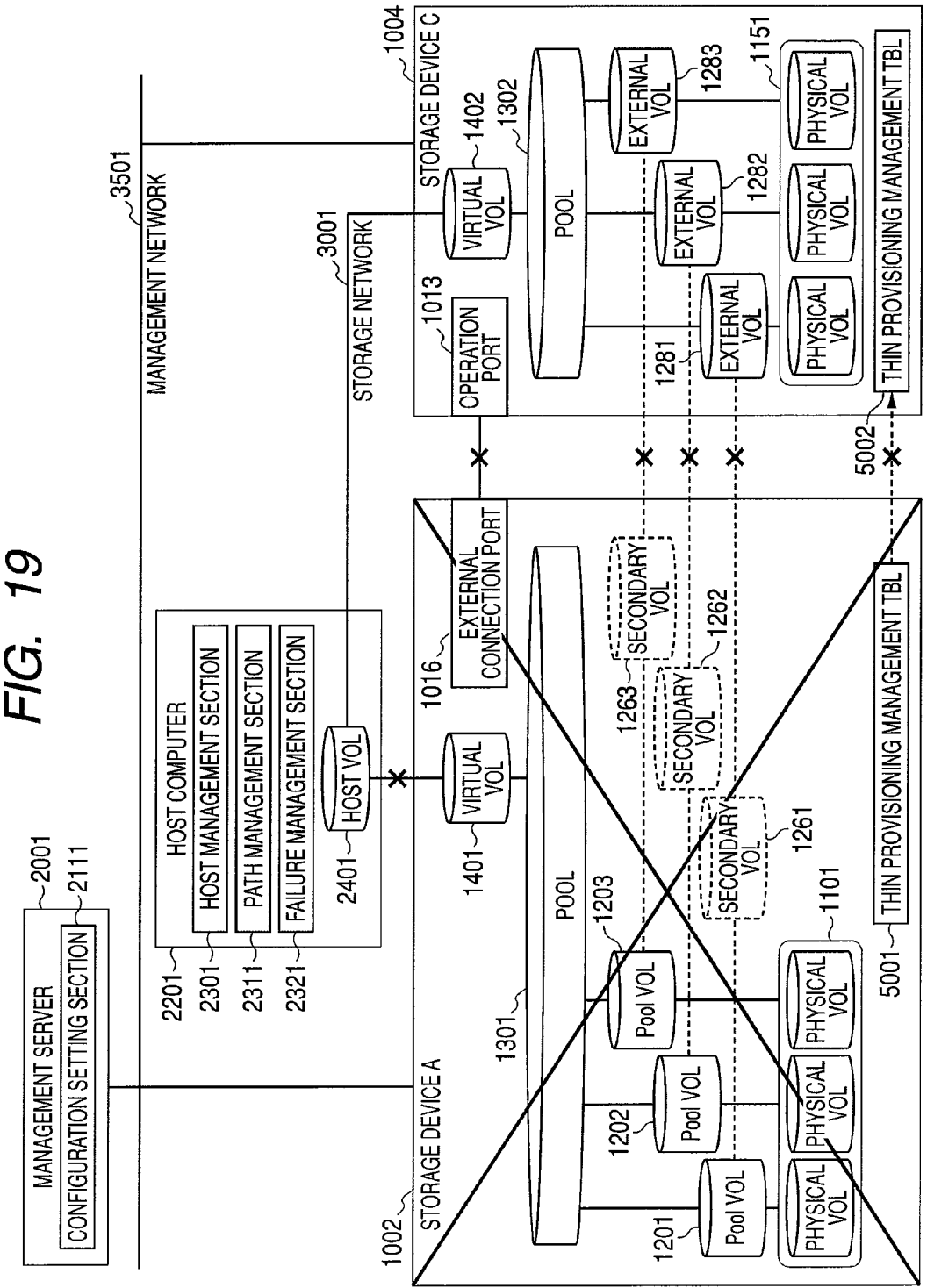
FIG. 19 is a diagram showing an exemplary configuration when the storage device is blocked in the storage system including the computer in the third embodiment of the invention.

FIG. 19 is a block diagram showing the configuration of, after the storage device A1002 is blocked in the first embodiment of the invention, taking over the volume to the end of the storage device C1004. Before blockage of the storage A1002, the configuration is almost the same as that of FIG. 12. The difference from this embodiment is the manner of handling the thin provisioning management TBL 5001 of FIG. 19.

In the third embodiment, after the storage device A1002 is blocked, there needs to replicate the configuration similar to that of the storage device A1002 on the end of the storage device C1004. On the end of the storage device C1004, there thus needs to have a replica of the thin provisioning TBL 5001 storing the mapping with the segments and the configuration information, i.e., the thin provisioning management TBL 5002. For implementation thereof, the synchronized remote copy function of the storage device may be used. When the storage device A1002 is blocked, the host computer 2201 detects the blockage, and issues a command to the storage device C1004 for taking over. Using the thin provisioning management TBL 5002, the storage device C1004 configures the pool 1302 and the virtual VOL 1402 of the same configuration as the storage device A1002. After completion of configuration of those in the storage device C1004, the host computer 2201 changes a connection-destination path of the host VOL 2401 to the storage device C1004, thereby completing the recovery. The details of this flow will be described later.

Figure 20:
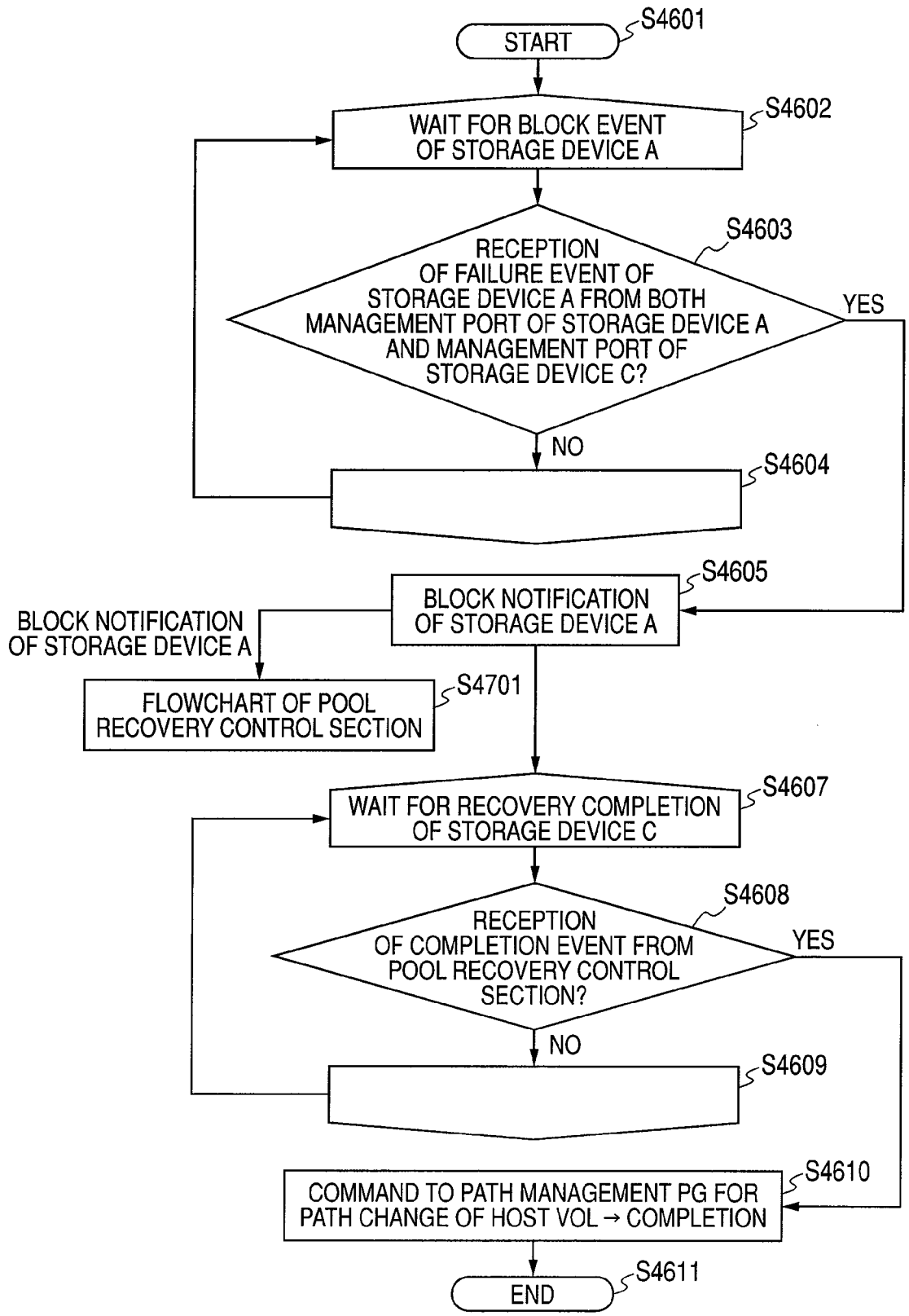
FIG. 20 is a flowchart of a process for recovery from an external storage when the storage device is blocked in the third embodiment of the invention.
Figure 21:
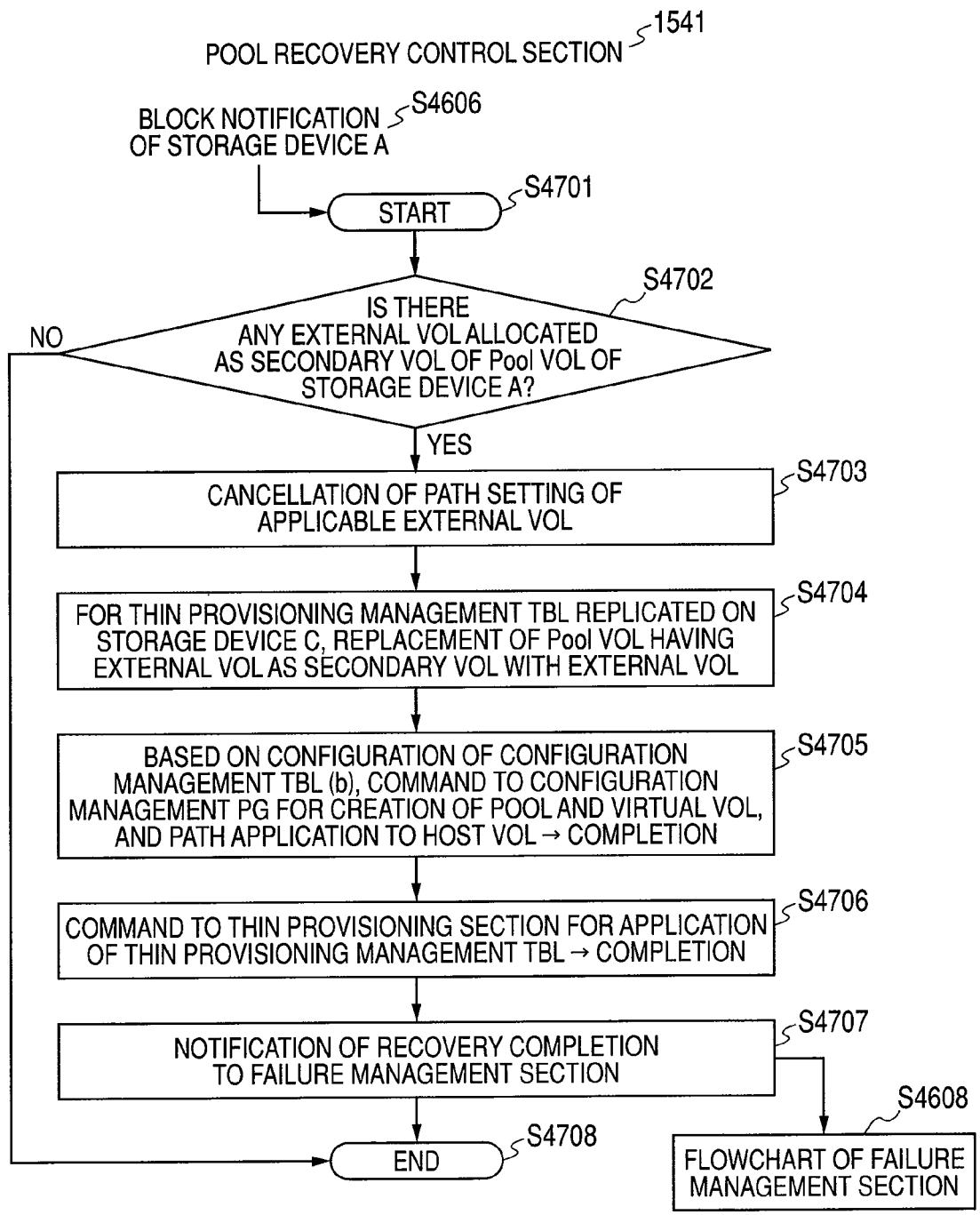
FIG. 21 is another flowchart of the process for recovery from the external storage when the storage device is blocked in the third embodiment of the invention.

FIG. 20 shows the flowchart of volume path change when the storage device A1002 is blocked, and FIG. 21 shows the setting flow for the storage device C1004 to take over the configuration of the storage device A1002. When detecting a block event of the storage device A1002, and determining that the storage device A1002 is being blocked, the failure management section 2321 of the host computer 2201 of FIG. 20 makes a notification thereof to the pool recovery control section 1541 of the storage device C (step S4605). For such a blockage determination, in consideration of network partition, when the block event is provided from both the management port 1015 of the storage device A1002 and the management port 1015 of the storage device C1004, for example, it is determined that the storage device A is being blocked (step S4603).

Thereafter, the failure management section 2321 waits for completion of the recovery of the storage device C1004 (step S4607), and when receiving a recovery completion event from the pool recovery control section 1541, a command is issued to the path management section 2311 to change the path of the host VOL 2401 to the virtual VOL 1402 on the storage device C1004. After completion thereof, the process is ended. In FIG. 21, the process is started in response when the pool recovery control section 1541 of the storage device C1004 is provided with a block notification of the storage device A1002 from the failure management section 2321 (step S4606).

First of all, a determination is made whether there is any external VOL 1281 having been allocated as a secondary VOL 1261 of the Pool VOL 1201 in the storage device A1002 using the configuration management TBL (b) 5202, and when there is no such an external VOL 1281, the process is ended. When there is any external VOL 1281 as such, the path setting of the applicable external VOL 1281 is cancelled (step S4703), and rewrites the thin provisioning management TBL 5002. Prior to such rewriting, if needed, the copy configuration for replicating the thin provisioning management TBL 5002 is cancelled. For rewriting, in the list of the table, any portion showing the Pool VOL 1201 including the external VOL 1281 as the secondary VOL 1261 as the Pool VOL identifier 5031 is overwritten by the external VOL 1281.

At this time, the relationship between the external VOL 1281 and the Pool VOL 1201 is acquired from the configuration management TBL (b) 5202 (step 4704). After rewriting, the pool recovery control section 1541 issues a command to the configuration management section 1521 for constructing the pool 1302 and the virtual VOL 1402 using the configuration management TBL (a) 5101, and making a path setting to the host computer 2201 (step S4705). After completion of such settings, a command is issued to the thin provisioning section 1531 for application of the thin provisioning management TBL 5002 (step S4706). After completion of the application, a notification of recovery completion is directed to the failure management section 2321 (step S4707), and this is the end of the process.

Described now is a modified example of this embodiment. This method is basically the same as those of FIGS. 17 and 19, but is different therefrom in the respect that the storage device A1002 has no secondary VOL 1261, and the external VOL 1281 of the storage device C1004 is directly mapped to the Pool VOL 1201 using the external connection function.

The process flow when the storage device A1002 is blocked is basically the same as those of FIGS. 20 and 21. The difference lies in that, in step S4702 of FIG. 21, a determination is made whether there is any external VOL having been allocated to the Pool VOL 1201, and in step S4704, the registration of the Pool VOL 1201 is replaced with any corresponding external VOL 1281. As such, also in this embodiment, if a storage device serving as a controller is entirely blocked, the storage device can be recovered using any external storage.

What is claimed is:

1. A storage system, comprising:
   a virtual volume of a virtual storage capacity;
   a pool that provides the virtual volume;
   a pool volume being a logical volume providing the pool;
   a thin provisioning processing section that allocates, to the virtual volume, only a storage area to be used by the virtual volume from the pool;
   a virtualization correlation map to be used by the thin provisioning processing section, and stores a mapping between the storage area to be used by the virtual volume and the pool volume;
   a secondary volume that carries a replica of data stored in the pool volume; and
   a pool recovery processing section that replaces, when the pool becomes not available for use due to a failure of the pool volume, in the virtualization correlation map, the failed pool volume with the secondary volume carrying the replica of the data stored in the pool volume, and makes the pool available for use again through application by the thin provisioning processing section.

2. The storage system according to claim 1, further comprising:
   a configuration setting section that sets, when a pool volume is newly added to the pool, a logical volume of a capacity same as that, of the pool volume as a secondary volume of the pool volume.

3. The storage system according to claim 2, wherein
   characteristics definition information is used to characterize the pool with respect to the pool,
   selection criteria information is used for a secondary volume selection in accordance with the characteristics definition information, and
   when the pool volume is newly added to the pool, the configuration setting section makes the secondary volume selection for use as a setting target from the characteristics definition information and the selection criteria information.

4. The storage system according to claim 2, further comprising:
   a physical device that physically allocates a storage area to the logical volume, wherein
   physical device characteristics information carries characteristics of the physical device,
   volume configuration information carries a mapping between the logical volume and the physical device, and
   the configuration setting section specifies, when the pool volume is newly added to the pool, the physical device allocated with the pool volume from the volume configuration information, and does not set the secondary volume to the pool volume in accordance with the physical device characteristics information corresponding to the specified physical device.

5. The storage system according to claim 1, further comprising:
   a host computer that uses the virtual volume through connection to the storage system over a network;
   the pool recovery processing section that specifies, after the pool volume is recovered from the failure, the host computer using the virtual volume provided by the pool volume from host volume mapping information, and forwards a notification thereof to the host computer; and
   a host recovery processing section that issues, after receiving the notification from the pool recovery processing section, a command to a program through reference of recovery processing definition information, wherein
   the host volume mapping information carries a mapping between the virtual volume and the host computer using the virtual volume, and
   the recovery processing definition information defines, when the virtual volume in the host computer is recovered, a process to be executed by the program using the virtual volume.

6. The storage system according to claim 1, further comprising:
   a storage cache being a storage area for storage of data before writing into the virtual volume in response to data writing from the host computer; and
   a data writing control section that performs control over the data writing from the storage cache to the virtual volume, and when receiving a notification from the pool recovery control section that the pool is not available for use, stops the data writing to the virtual volume for a duration of the notification, wherein
   when the pool becomes not available for use due to the failure of the pool volume, the pool recovery control section makes a notification to the data writing control section about a time of becoming unavailable for use and a time of recovery.

7. The storage system according to claim 1, wherein
   after the pool is recovered and becomes available for use again, the pool recovery control section sets, to a new pool volume, a logical volume of the same capacity as a secondary volume of the pool volume.

8. The storage system according to claim 1, further comprising:

a management computer that manages the storage system through connection thereto;

a backup acquisition processing section that stores, when executing backup of the pool in response to a backup command from the management computer, a replica of the virtualization correlation map, stops data update of an entire of the pool volumes providing the pool to the secondary volume based on pool configuration information, and registers pool backup information; and a pool recovery processing section that specifies, when recovering the pool in response to a restore command from the management computer, the secondary volume from the pool backup information, replaces the pool volume with the secondary volume, replaces the virtualization correlation map with the replica thereof in storage, and makes the pool available for use through application by the thin provisioning processing section, wherein the pool configuration information carries a mapping among the pool, the pool volume, and the secondary volume, and the pool backup information carries a configuration of the secondary volume storing a backup of data stored in the pool.

9. A computer system configured by a first storage system, and a second storage system to be connected to the first storage system over a network, wherein the first storage system includes:

a virtual volume of a virtual storage capacity;

a pool that provides the virtual volume;

a pool volume being a logical volume providing the pool;

a thin provisioning processing section that allocates, to the virtual volume, only a storage area to be used by the virtual volume from the pool;

a virtualization correlation map that is used by the thin provisioning processing section, and stores a mapping between the storage area to be used by the virtual volume and the pool volume, an external connection processing section that makes available, from the first storage system, a logical volume of the second storage system being an external volume from the first storage system by establishing a mapping as a logical volume on the first storage system;

a pool volume replica control section that stores a replica of data of the pool volume with the logical volume of the first storage system mapped to an external volume being a secondary volume; and a pool recovery processing section that replaces, when the pool becomes not available for use due to a failure of the pool volume, in the virtualization correlation map, the failed pool volume with the secondary volume carrying the replica of the data stored in the pool volume, and makes the pool available for use again through application by the thin provisioning processing section.

10. The computer system according to claim 9, further comprising:

a second configuration setting section that searches and specifies, when a pool volume is newly added to the pool, in the second storage system, an external volume having a capacity same as that of the pool volume, and when the external volume is not found, newly generates an external volume; and a first configuration setting section that maps the external volume specified or newly generated to the first storage system, and sets the external volume as a secondary volume of the pool volume.

11. The computer system according to claim 10, wherein the second configuration setting section sets, when mapping the external volume to the first storage system, a path to a port identifier of the second storage system and to a port identifier of the first storage system for external connection use.

12. The computer system according to claim 10, wherein when the capacity remained in the pool for use exceeds a predetermined threshold value, the first configuration setting section searches and specifies any of the pool volumes available for addition to the pool, and when none of the pool volumes is available for addition, newly generates a pool volume for additional registration to the pool.

13. A computer system configured by a host computer, a first storage system connected to the host computer over a network, and a second storage system connected to the host computer and the first storage system over the network, wherein the first storage system includes:

a virtual volume of a virtual storage capacity;

a pool that provides the virtual volume;

a pool volume being a logical volume providing the pool;

a thin provisioning processing section that allocates, to the virtual volume, only a storage area to be used by the virtual volume from the pool;

a virtualization correlation map that is used by the thin provisioning processing section, and stores a mapping between the storage area to be used by the virtual volume and the pool volume, an external connection processing section that makes available, from the first storage system, a logical volume of the second storage system being an external volume from the first storage system by establishing a mapping as a logical volume on the first storage system; and a pool volume replica control section that stores a replica of data of the pool volume with the logical volume of the first storage system mapped to an external volume being a secondary volume, wherein the virtualization correlation map is replicated by a remote copy control section of the first storage system and that of the second storage system from the first storage system to the second storage system, the second storage system includes a pool recovery processing section that creates, when the first storage system becomes not available for use due to a failure, using the replica of the virtualization correlation map with the external volume being the pool volume, a pool and a virtual volume of a configuration same as those of the first storage system on the second storage system, and makes a notification thereof to the host computer, and the host computer includes a path change setting section that changes, in response to the notification from the pool recovery processing section, a connection relationship with the virtual volume on the first storage system to the virtual volume on the second storage system.

* * * * *